United States Patent [19]

Ledoux et al.

[11] Patent Number: 5,139,987
[45] Date of Patent: Aug. 18, 1992

[54] PROCESS FOR ACTIVATING THE SURFACE OF CARBIDES OF HEAVY METALS WITH A LARGE SPECIFIC SURFACE FOR CATALYTIC REACTIONS

[75] Inventors: Marc-Jacques Ledoux; Jean-Louis Guille; Cuong Pham-Huu; Sophie Marin, all of Strasbourg, France

[73] Assignee: Pechiney Recherche, Courbevoie, France

[21] Appl. No.: 754,927

[22] Filed: Sep. 4, 1991

[30] Foreign Application Priority Data

Sep. 6, 1990 [FR] France .................. 90 11633

[51] Int. Cl.⁵ .................. B01J 27/22; B01J 37/14
[52] U.S. Cl. .................. 502/177
[58] Field of Search .................. 502/177

[56] References Cited

U.S. PATENT DOCUMENTS 4,515,763  5/1985  Boudart et al. .................. 423/409
4,518,707  5/1985  Soled et al. .................. 502/117 X
4,536,358  8/1985  Welsh et al. .................. 264/81

FOREIGN PATENT DOCUMENTS 0286294  10/1988  European Pat. Off. .
0396475  11/1990  European Pat. Off. .
2657603  8/1991  France .
2-180641  7/1990  Japan .

Primary Examiner—William J. Shine
Assistant Examiner—Douglas J. McGinty
Attorney, Agent, or Firm—Dennison, Meserole, Pollack & Scheiner

[57] ABSTRACT

Process for activating carbides of heavy metals with a large specific surface with a view to their use as a catalyst for chemical or petrochemical reactions consisting of treating the said carbides by managed oxidation under an oxidizing gas stream at a temperature between 250° and 450° C., maintaining the temperature for at least 3 hours and then cooling to ambient temperature, still under said oxidizing stream.

12 Claims, 1 Drawing Sheet

PROCESS FOR ACTIVATING THE SURFACE OF CARBIDES OF HEAVY METALS WITH A LARGE SPECIFIC SURFACE FOR CATALYTIC REACTIONS

FIELD OF THE INVENTION

The invention relates to a process for activating the surface of carbides of heavy metals having a particularly large specific surface with a view to the use of said carbides as catalysts for petrochemical and chemical reactions, particularly the refining and transformation of petroleum products, the conversion of exhaust gases, etc.

This activation process consists of thermally treating the heavy metal carbide under clearly defined temperature and time conditions in the presence of a gas containing oxygen.

The metals of carbides covered by the process of the invention are more particularly transition metals (groups 3b,4b,5b,6b,7b,8 of periods 4,5,6 of the classification of elements), including rare earths (lanthanides) and actinides. Of particular interest are Mo, W, Re, V and Nb or Ta, Ti, Cr or Ni.

The invention applies inter alia to carbides of heavy metals having a large specific surface obtained by the processes described in patent numbers EP 396,475 and FR 2,657,603.

DESCRIPTION OF RELATED ART

According to EP 396,475, carbides of heavy metals are obtained by reacting one of their compounds in the gaseous state with a reactive carbon having a large specific surface (at least equal to 200 $m^2/g$), the carbon quantity generally being in excess, at a temperature between 900° and 1400° C.

Any active carbon type is suitable, granulated or agglomerated active carbon being more particularly suitable. This carbon can be previously doped by impregnation with the aid of a dissolved metallic element, such as Ce, Ti, U, Zr, Hf, lanthanide, etc. The transformation of the carbon into carbide can be complete or partial, the carbide particles then having a central part or core made from carbon covered with at least one large surface carbide layer.

It is also possible to successively react different metallic gaseous compounds with the reactive carbon, so as to obtain mixed carbides with a large specific surface. The core can then either be of carbon or of carbide with a large specific surface and can be covered by one or more layers of carbides having a large specific surface. The elements able to give such mixed carbides are those referred to hereinbefore, plus silicon, the latter also being present in the active outer layer, but is generally used for producing the core of the mixed carbide.

In FR 2,657,603, the carbides of heavy metals with a large specific surface are obtained by mixing an exclusively organic, carbonizable resin and a metal or one of its carbon-reduceable compounds, followed by the crosslinking of the said resin and heat treatment in order to initially carbonize the resin and then optionally reduce the metallic compound and finally carburize the metal.

The resin is generally a hot-forming resin, to which can be added various adjuvants, such as blowing agents, specific surface generating agents, doping agents, etc.

The carbon quantity is in slight excess compared with the reduction and carburization reactions provided. Carbonization generally takes place at between 500° and 1000° C. and carburization between 1000° and 1600° C., preferably between 1000° and 1300° C., under a non-oxidizing atmosphere.

The carbides of heavy metals with a large specific surface normally have a specific surface greater than 1.5 $m^2/g$, generally greater than 15 $m^2/g$ and even reaching more than 100 $m^2/g$, e.g. using the processes of the aforementioned patent applications.

However, their surface can be deteriorated during manipulations in air, which tends to comprimise their efficiency for certain catalytic applications. In addition, a reactivation treatment has been described (EP 396,475) using a carbide impregnation by a weakly concentrated solution of a salt of a metal of group 8 followed by a heat treatment under a hydrocarbon and hydrogen stream. The activity obtained is particularly appropriate and effective for application to catalysis.

Other documents describe treatments of metal carbides by an oxidizing gas. U.S. Pat. Nos. 4,515,763 (Boudart) and 4,518,707 (Soled) describe passivation treatments applied to metal carbides prepared in a reducing medium, with a mixture of hydrogen and hydrocarbons. Such carbides spontaneously ignite if brought into air without precautions being taken, because they are pyrophoric. The passivation consists of contacting the catalyst with small amounts of an oxidizing agent (Boudart), diluted in a neutral gas and at ambient temperature (Soled). The oxidation conditions must be very gentle in order to prevent ignition. In particular, the oxygen content of the oxidizing agent must be approximately 1%.

U.S. Pat. No. 4,536,358 describes final treatments in an oxidizing medium for burning the excess carbon-containing pyropolymer deposited on a mineral oxide substrate and which has not been transformed into metal carbide. In the case of silicon carbide, the examples indicate treatments lasting 20 hours at 600° C.

SUMMARY OF THE INVENTION

The object of the present invention is to totally avoid the use of noble metals of group 8 referred to hereinbefore in order to bring about a high activation level for the catalysis of chemical and petrochemical reactions, such as e.g. the refining of petroleum products, the conversion or purification of exhaust gases of internal combustion engines, etc.

Thus, the Applicant has developed a process for activating carbides of heavy metals with a large specific surface and in particular those obtained according to any one of the claims 1 to 6 of EP 396,475 or to any one of the claims 1 to 2, 4 to 10 of FR 2,657,603, characterized in that they are thermally treated under an oxidizing gas stream at a temperature between 250° and 450° C., whilst maintaining the temperature for at least 3 h and in that they are cooled to ambient temperature, still under said oxidizing stream in order to obtain an activated catalyst.

This activation phase under an oxidizing gas stream is generally followed by a phase of balancing and adapting the surfaces of the activated catalyst with respect to the product to be catalytically treated. This balancing and adapting phase takes place by raising the catalyst activated by oxidation to a temperature corresponding to that used in the planned catalytic reaction for transforming the gaseous products, under the flow of at least part of said gaseous products to be treated, the catalyst then progressively giving its maximum efficiency.

For example, for petroleum product reforming reactions, it is possible to raise the oxidation-activated catalyst to approximately 350° C. under a preferably pure hydrogen stream. When said temperature is reached, the hydrocarbon to be treated is introduced into the hydrogen. As from approximately the fifth hour, the maximum catalytic activity is substantially reached. The degree of purity of the hydrogen has a favourable influence on the efficiency of the catalyst.

DETAILED DESCRIPTION OF THE INVENTION

Figure 1:
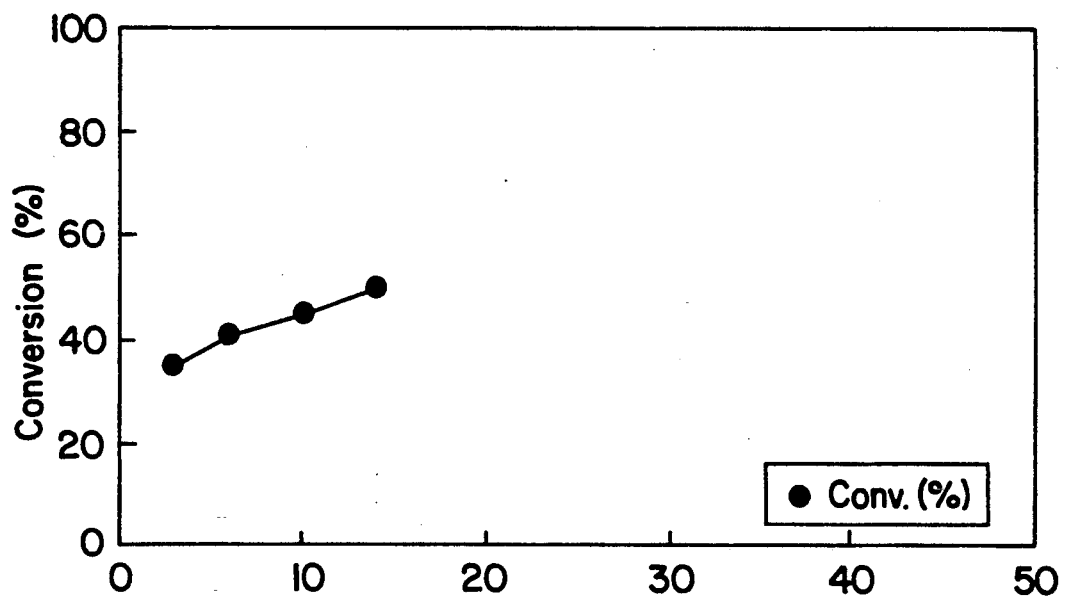
FIG. 1 is a graph of conversion percentage for n-hexane versus catalyst oxidizing treatment time.

Contrary to all expectations, the oxidizing treatment according to the invention leads to a very high quality activation, whereas manipulations in air of carbides having a large specific surface are considered to be prejudicial to their use as catalysts.

However, the conditions of this oxidizing treatment are particularly critical. The oxidizing gas used is generally air, but can be pure oxygen or oxygen diluted to a greater or lesser extent by an inert gas. There is no interest in excessively diluting the oxygen and preference is given to the use of a gas containing at least 10% oxygen. The temperature must be between 250° and 450° C. It has been found that at a temperature below 250° C., in order that the treatment is effective it is necessary to operate for an unacceptable period of time, whereas temperatures above 450° C. lead to an irreversible destruction of the carbide making it unusable. The treatment times must exceed 3 hours and preferably 10 hours, but the best results are obtained for 12 to 16 hours or longer, the performance characteristics of the catalyst increasing with the treatment time.

In the particular case of molybdenum carbide and with air as the oxidizing gas, the temperature range is even narrower and is around 350° C. The influence of the time is very marked. It is possible to characterize the efficiency of the catalyst by the conversion level observed during the isomerization of n-hexane and which is defined as the percentage of n-hexane isomerized or cracked during the catalysis. If this level is plotted as a function of the oxidizing treatment time, according to FIG. 1, a virtually linear relationship is obtained.

A plausible explanation can be given for this. Thus, a more or less oxygen-enriched phase is obtained in the near surface of the catalyst as a result of the oxidizing treatment, said enriched phase being responsible for the catalytic activity. If the oxidizing treatment is too short, the oxygen-enriched phase layer is too thin and is very rapidly recarburized by the hydrocarbon contained in the reactive mixture. On increasing the oxidizing treatment time, the carbide oxidizes increasingly deeply and the surface oxide layer is increasingly thick. Thus, when the surface-oxygenated compounds are reduced and recarburized by the reactive mixture, part is compensated by oxygen atoms diffusing from the deeper layers towards the surface. After a certain time, a stable equilibrium is established on the surface of the catalyst between the surface disappearance of the oxygen atoms, the diffusion towards the surface of oxygen atoms from deeper layers and the arrival of reagents, giving rise to a more or less oxygen-rich carbide phase (oxycarbide), which has a high reactivity in the isomerization process. As indicated in the examples, this also explains why the full effectiveness of the catalyst is only reached after a certain reagent passage time.

In the case of molybdenum carbide, these hypotheses are confirmed by XPS (X-Ray Photoelectron Spectroscopy) analyses making it possible to identify the chemical species and the valence states under which the molybdenum is found on the surface.

XPS analysis consists of bombarding the surface of the sample with an X-ray beam and analysing the kinetic energy of the photoelectrons emitted with the aid of an electron spectrometer. Its penetration depth is approximately 5 nanometres, which permits very precise surface measurements.

The measurements were performed on the one hand on the catalyst just after the air-activation treatment at 350° C. and on the other hand following the same air-treatment, for three, six, ten or fourteen hours, followed by n-hexane reforming for 35 hours in order to bring the catalyst into its state of equilibrium and optimum efficiency. The measurements allowed analysis of Mo $V_I$, Mo V, Mo IV and molybdenum bonded to carbon Mo-C. The results obtained are given in the following table, in which the percentages are those of the surface atoms of Mo in the chemical species indicated at the top of the column:

|  | Mo VI | Mo V | Mo IV | Mo-C |
| --- | --- | --- | --- | --- |
| After activation Before reforming | 90% | — | 7% | 3% |
| After reforming |  |  |  |  |
| 3 h activation | 18% | 30% | 37% | 16% |
| 6 h activation | 19% | 32% | 49% | 0% |
| 10 h activation | 21% | 40% | 38% | 0% |
| 14 h activation | 16% | 46% | 38% | 0% |

The Mo VI is particularly involved in the oxide $MoO_3$, the Mo V in an oxycarbide and the Mo IV either in an oxycarbide or in the oxide $MoO_2$.

The figures in the first line corresponding to the catalyst leaving the activation treatment are identical no matter what the treatment time. The high $MoO_3$ content and the low carburized molybdenum content are explained by the relative violence of the activation, which oxidizes substantially the entire surface.

The figures in the following lines resulting from measurements on the catalyst after 35 hours reforming of n-hexane, demonstrate the significant differences as a function of the activation treatment time. The Mo V content in an oxycarbide increases with the duration of the treatment. The Mo IV content can also be in an oxycarbide and is stabilized on increasing the treatment time.

As the catalytic activity increases with the activation treatment time, it is therefore likely that these oxycarbides are, as thought, responsible for the catalytic activity.

The process described hereinbefore can be applied to all carbides with a large specific surface of the metallic elements, such as those referred to hereinbefore, including mixed carbides (particularly those having a silicon carbide core, obtained and described in European application 396475). They can be in the form of powder, granules, shaped parts, etc.

EXAMPLE 1

An activation treatment according to the invention was performed on a molybdenum carbide having an initial specific surface of 180 m$^2$/g obtained by the process of Example 1 of European application 396475. For this purpose purging took place under an air flow, at ambient temperature and for 10 minutes. Then, still under the same air flow, the temperature was raised to 350° C. and was maintained for 14 h, followed by cooling to ambient temperature.

Following this treatment according to the invention evaluation took place of the suitability of said activated carbide for catalysing the isomerization (i.e. reforming) the n-hexane in the presence of H$_2$.

For this purpose, 200 mg of activated catalyst was heated to 350° C. under a standard pure H$_2$ flow (purity greater than 99.95%, with as the known impurities O$_2$<5 ppm, H$_2$O<5 ppm and N$_2$<40 ppm) at atmospheric pressure. Once the temperature was reached, the n-hexane to be reformed was added in such a way that its partial pressure in the mixture is 5 torr.

The catalytic performance characteristics obtained during reforming were plotted as a function of time in order to evaluate any aging effect of the activated catalyst.

Measurements also took place of the effect of using even purer hydrogen obtained by passing the standard hydrogen over a zeolite in liquid nitrogen. Finally, testing took place of the effect of the addition of a known catalyst poison (2% mixture of H$_2$S in H$_2$).

After these treatments and at the end of the test, the activated catalyst retains a specific surface of 135 m$^2$/g and a remarkable potential. All these results appear in the first part of Table 1.

To show the undeniable advantage of the carbides obtained according to the invention, a comparison was made by performing the same n-hexane reforming reaction under the same conditions (350° C., hydrogen pressure 1 atm, partial n-hexane pressure 5 Torr), in the presence of a conventional catalyst constituted by 0.18% Pt on an alumina support. The results of this standard catalysis as a function of time are also given in the second part of Table 1.

In the tables:
- α % represents the conversion expressed by the molar percentage of the starting product transformed by isomerization and cracking;
- r represents the conversion rate expressed in 10$^{-10}$ mole of starting product transformed per second and related to 1 g of catalyst and which represents the catalyst activity;
- Si % (or C6 selectivity) represents the selectivity, expressed by the molar proportion of isomerized product present in the transformed product obtained (expressed in C6);
- isomerization yield (10$^{-10}$ mole/s.g), i.e. the product (rxSi) expressed in 10$^{-10}$ mole of isomers obtained per second and reduced to 1 g of catalyst, said efficiency measuring the effectiveness of the catalyst.

TABLE 1

Isomerization of n-hexane

| Time (min) | Activated Mo carbide catalyst according to the invention | | | | Conventional catalyst (0.18% Pt on Al$_2$O$_3$) | | | |
|---|---|---|---|---|---|---|---|---|
| | α (%) | r (10$^{-10}$ mole/s.g) | Si (%) | yield (r × Si) (10$^{-10}$ mole/s.g) | α (%) | r (10$^{-10}$ mole/s.g) | Si (%) | yield (r × Si) (10$^{-10}$ mole/s.g) |
| | Standard H$_2$ | | | | Purified H$_2$ | | | |
| 0 | 0.23 | 12 | 74 | 9 | 50.66 | 3144 | 79 | 2484 |
| 50 | | | | | 38.44 | 3009 | 81 | 2437 |
| 280 | 17.13 | 794 | 87 | 691 | | | | |
| 1390 | 20.64 | 934 | 89 | 831 | | | | |
| 1440 | Purified H$_2$ | | | | | | | |
| 1450 | 26.95 | 1169 | 91 | 1064 | 12.42 | 1131 | 84 | 950 |
| 1750 | 48.14 | 1730 | 88 | 1528 | 6.01 | 632 | 79 | 499 |
| 2040 | 48.51 | 1742 | 91 | 1585 | | | | |
| 2055 | Standard H$_2$ | | | | | | | |
| 2350 | 20.3 | 922 | 92 | 848 | 4.11 | 446 | 79 | 325 |
| 2885 | Purified H$_2$ | | | | | | | |
| 2985 | 47.26 | 1719 | 91 | 1564 | | | | |
| 4350 | 48.33 | 1739 | 87 | 1513 | 0.76 | 82 | 79 | 65 |
| 4370 | Injection of 5 cm$^2$ of H$_2$S(2%) + H$_2$ | | | | | | | |
| 4375 | 19.11 | 874 | 91 | 795 | | | | |
| 4445 | 42.29 | 1617 | 90 | 1455 | | | | |
| 4555 | Injection of 10 cm$^2$ of H$_2$S(2%) + H$_2$ | | | | | | | |
| 4560 | 17.73 | 818 | 93 | 761 | | | | |
| 4645 | 33.35 | 1378 | 92 | 1268 | | | | |

Examination of this table reveals that following activation according to the invention, the carbide-based catalyst has a selectivity of approximately 90%, which is well above that of the conventional Pt-based catalyst, which is approximately 80%.

With respect to the conversion rate and percentage, it can be seen that although the carbide according to the invention has a less immediate response time than that of the conventional Pt catalyst, it rapidly reaches levels above that of the Pt.

Thus, the Pt-based catalyst is immediately effective (cf. the efficiency column), but its effectiveness decreases regularly and becomes inadequate after approximately 30 hours (efficiency 500), whereas there is no reduction in the carbide efficiency. This efficiency is already very high as from the fifth hour and is then continuously maintained at a higher and substantially constant level of at least approximately 800.

The efficiency level is further improved by using purified hydrogen, the yield being higher than approximately 1100 and generally approximately 1500.

Moreover, after injecting H$_2$S (standard catalyst poison), it can be seen that the efficiency of the catalyst according to the invention instantaneously drops and then reassumes its previous level, whereas it is known that a conventional Pt catalyst instantaneously becomes unusable.

In summarizing, it can be seen that with an activated heavy metal carbide-based catalyst according to the invention, it is possible to obtain a selectivity, a conversion efficiency, a conversion percentage higher than those of a conventional Pt catalyst, a remarkable insensitivity to the standard catalyst poison and a limitless life.

EXAMPLE 2

This example illustrates the fact that the activated carbide according to the invention is completely different from a prior art molybdenum oxide-based catalyst. The catalyst was obtained by impregnating an alumina support with a solution of a decomposable molybdenum salt (ammonium heptamolybdate). This impregnated support was calcined in a neutral atmosphere to obtain a molybdenum oxide catalyst containing 6.88% Mo.

This molybdenum oxide catalyst was then activated according to the inventive process by treatment at 350° C., under an air flow, for 14 h and then cooling to ambient temperature.

This activated catalyst was then used for isomerizing n-hexane under the same conditions as in Example 1 under a purified hydrogen stream. The results are given in Table 2.

TABLE 2

| Isomerization of n-hexane Prior art MoO$_2$ catalyst on Al$_2$O$_3$ | | | |
| --- | --- | --- | --- |
| Time (min) | α (conversion) (%) | Si (selectivity) (%) | Yield (10$^{-10}$ mole/s.g) |
| 0 | 0 | — | 0 |
| 60 | 0.56 | 41 | 20 |
| 90 | 0.76 | 42 | 28 |
| 235 | 1.58 | 34 | 58 |
| 415 | 1.98 | 33 | 72 |
| 1410 | 3.14 | 23 | 113 |
| 1790 | 2.66 | 25 | 97 |
| 1890 | 1.17 | 38 | 43 |
| 1930 | 0.94 | 45 | 34 |
| 1960 | 0.9 | 44 | 33 |

The results obtained are inferior to those obtained with an activated carbide catalyst according to the invention. It is particularly interesting to note that the selectivity, which represents the possibility of obtaining an isomerization rather than a cracking is much lower (not exceeding 45%) than that obtained with the activated carbide according to the invention (better than 90%). This tends to demonstrate that the activated carbide-based catalyst according to the invention is of a different nature and cannot be likened to a conventional oxide, which would form during a managed oxidation treatment.

It can also be seen that after the yield has passed through a not very high maximum, it then regularly decreases.

We claim:

1. Process for the activation of a material consisting essentially of a carbide of a heavy metal with a large specific surface area for use as a catalyst for chemical or petrochemical reactions, comprising the steps of: thermally treating said carbide under an oxidizing gas stream at a temperature between 250° and 450° C., while maintaining said temperature for at least 3 hours; and cooling said thermally treated carbide to ambient temperature, while still under said oxidizing stream, in order to obtain an activated catalyst.

2. Process according to claim 1, wherein the thermal treating temperature is approximately 350° C. and the temperature is maintained for more than 10 hours.

3. Process according to claim 1, wherein the oxidizing gas is selected from the group consisting of air and pure oxygen diluted by an inert gas.

4. Process according to claim 1, wherein the thermal treating temperature is approximately 350° C. and the temperature is maintained for between 12 and 16 hours.

5. Process according to any one of claims 1 to 4, wherein the heavy metal carbide with a large specific surface is selected from the group consisting of the transition metal carbides, rare earths, lanthanides and actinides.

6. Process according to claim 5, wherein the heavy metal carbide with a large specific surface is a carbide selected from the group consisting of Mo, W, Re, V and Nb.

7. Process according to claim 4, wherein the heavy metal carbide with a large specific surface is molybdenum carbide, the temperature maintained is approximately 350° C. and thermal treating erature is maintained for more than 16 hours.

8. Process according to any one of the claims 1 to 4, wherein the heavy metal carbide with a large specific surface is a mixed carbide having a carbon or carbide core with a large specific surface area covered by one or more layers of different heavy metal carbides with a large specific surface area.

9. Process according to claim 8, wherein said carbide core comprises silicon carbide.

10. Process according to any one of the claims 1 to 4, including there is a phase of balancing and adapting the surfaces of the activated catalyst comprising an additional step raising said activated catalyst to a temperature corresponding to that used for an envisaged catalytic transformation of the gaseous products, under a stream of at least part of said gaseous products to be treated.

11. Process according to claim 10, wherein the temperature corresponding is approximately 350° C. and the gaseous stream is constituted by hydrogen.

12. Product based on an activated carbon obtained by the process according to any one of the claims 1 to 4.

* * * * *

UNITED STATES PATENT AND TRADEMARK OFFICE
CERTIFICATE OF CORRECTION

PATENT NO. : 5,139,987

DATED : August 18, 1992

INVENTOR(S) : MARC-JACQUES LEDOUX et al

It is certified that error appears in the above-identified patent and that said Letters Patent is hereby corrected as shown below:

Column 4, line 23, change "Mo $V_I$" to --Mo VI--.

Col. 8, claim 12, line 1, change "carbon" to --carbide--

Signed and Sealed this

Twenty-sixth Day of October, 1993

Attest:

BRUCE LEHMAN

Attesting Officer     Commissioner of Patents and Trademarks